United States Patent [19]

Sato et al.

[11] Patent Number: 5,246,245
[45] Date of Patent: Sep. 21, 1993

[54] DOUBLE-WISHBONE-TYPE FRONT WHEEL SUSPENSION SYSTEM

[75] Inventors: Masaharu Sato, Naka; Naoto Fukushima, Kamakura, both of Japan

[73] Assignee: Nissan Motor Co., Ltd., Yokohama, Japan

[21] Appl. No.: 785,479

[22] Filed: Oct. 31, 1991

[30] Foreign Application Priority Data

Nov. 5, 1990 [JP] Japan .................. 2-297156

[51] Int. Cl.⁵ ............................... B60G 3/20
[52] U.S. Cl. .................. 280/663; 280/675; 280/691
[58] Field of Search .......... 280/661, 663, 675, 691, 280/673

[56] References Cited

U.S. PATENT DOCUMENTS

| | | | |
|---|---|---|---|
| 4,948,161 | 8/1990 | Tonomura | 280/661 |
| 5,048,860 | 9/1991 | Kanai et al. | 280/675 |
| 5,094,472 | 3/1992 | Oyama et al. | 280/661 |
| 5,102,159 | 4/1992 | Sato et al. | 280/675 |

FOREIGN PATENT DOCUMENTS

0454994 11/1991 European Pat. Off. ......... 280/675

*Primary Examiner*—Tamara L. Graysay
*Attorney, Agent, or Firm*—Foley & Lardner

[57] ABSTRACT

A double-wishbone type suspension system includes a hub carrier for rotatably supporting a front wheel of a vehicle, and upper and lower link devices for connecting upper and lower ends of the hub carrier to a vehicle body, respectively. The upper link device is connected to the vehicle body and the hub carrier at first and second connecting points, respectively. The lower link device includes a link element to be applied with a steering force such that the hub carrier is rotated about a kingpin axis which passes a point between the upper and lower ends of the hub carrier. The suspension system has a novel geometrical arrangement such that, in the case of a front wheel which is situated on outer side with reference to a cornering center, the second connecting point is caused during a steering operation to move along an arcuate path about the first connecting point so that the kingpin axis is tilted inwardly. During a steering operation, the front wheel has a camber characteristic which exhibits a negative camber tendency while minimizing a force component tending to lift the front wheel to ensure a natural steering feel.

19 Claims, 6 Drawing Sheets

FIG_1

FIG_3

FIG_5

FIG_7

FIG_9

FIG_10

DOUBLE-WISHBONE-TYPE FRONT WHEEL SUSPENSION SYSTEM

BACKGROUND OF THE INVENTION

1. Field of the Invention

The present invention relates to a double-wishbone type suspension system for a front wheel of an automobile vehicle.

2. Description of the Related Art

This kind of double-wishbone type suspension system is disclosed, for example, in a Japanese monthly journal "Motor Fan", June, 1987, at page 79, and generally includes a hub carrier for rotatably supporting a front wheel of a vehicle, and upper and lower link devices for connecting upper and lower ends of the hub carrier to a vehicle body, respectively. The lower link device includes a link element which is to be applied with a steering force for causing rotation of the hub carrier and resultant steering of the front wheel. A variety of double-wishbone type suspension systems are known, depending upon the manner for supporting the upper and lower link devices in the fore-and-aft direction of the vehicle body.

However, according to conventional double-wishbone type suspension system, the kingpin axis about which the hub carried and hence the front wheel are rotated is theoretically fixed even during the steering operation, as can be readily appreciated from the publication mentioned above. The camber characteristic of the vehicle during the front wheel steering operation is thus uniquely determined by the caster angle, i.e. an inclination angle of the kingpin axis with reference to the fore-and-aft direction of the vehicle body.

It is well known that the cornering performance of the vehicle during the steering operation of the front wheels is primarily influenced by the cornering power of an outer front wheel which is situated on outer side with reference to the cornering center. Furthermore, the rolling of the vehicle body during the steering operation tends to increase the camber angle of the outer front wheel and hence the tire inclination angle with reference to the ground surface in the positive camber direction, thereby lowering the cornering power of the outer front wheel. In consideration of these factors, it is required for the camber characteristic of the outer front wheel to exhibit a negative camber tendency during the steering operation.

For adapting the known double-wishbone type suspension systems to the above-mentioned requirement, it has been generally considered necessary to increase the kingpin axis inclination angle (i.e. caster angle) with reference to the fore-and-aft direction of the vehicle body. However, the kingpin axis setting for realizing an increased caster angle often results, not only in increased steering force, i.e. the operational force required for steering the front wheels, but also in generation of a force component which tends to lift the front wheels with an apparent relative decrease in the body height of the vehicle body front section, thereby significantly deteriorating a natural steering feel.

SUMMARY OF THE INVENTION

It is therefore a general object of the present invention to provide an improved double-wishbone type suspension system for a front wheel of an automobile vehicle, which is capable of eliminating or at least mitigating the aforementioned problems.

It is a more specific object of the present invention to provide an improved double-wishbone type suspension system for a front wheel of an automobile vehicle, wherein the outer front wheel has a camber characteristic which exhibits a negative camber tendency during the steering operation, without increasing the required steering force or generating a force component which tends to lift the front wheels, while preserving a natural steering feel.

The inventors have already proposed a double-wishbone type suspension system for a front wheel, wherein the kingpin axis passes through the upper and lower ends of the hub carrier for improving the degree of freedom in designing the geometrical configuration of the hub carrier, as fully disclosed in co-pending U.S. patent application No. 07/676,112 (now U.S. Pat. No. 5,102,159) or German Pat. Appln. No. P 41 10 142.1. For such a particular suspension system, it would be still desirable to further refine the arrangement of various elements with the aforementioned objects in mind.

Thus, the present invention starts from the suspension system according to the above-mentioned earlier proposal, and is based on a novel recognition that a unique arrangement of the upper link device makes it possible to induce a camber angle variation in a negative camber direction by causing an inward inclination of the kingpin axis for the outer front wheel during the steering operation.

According to one aspect of the present invention, there is provided a double-wishbone type front wheel suspension system which comprises a hub carrier for rotatably supporting a front wheel of a vehicle, and upper and lower link devices for connecting upper and lower ends of the hub carrier to a vehicle body, respectively, the upper link device being connected to the vehicle body and the hub carrier at first and second connecting points, respectively, lower link device including a link element to be applied with a steering force such that hub carrier is rotated about a kingpin axis which passes a point between the upper and lower ends of the hub carrier, the suspension system having such a geometrical arrangement that, in the case of a front wheel which is situated on outer side with reference to a cornering center, the second connecting point is caused during a steering operation to move along an arcuate path about the first connecting point so that the kingpin axis is tilted inwardly.

According to another aspect of the present invention, there is provided a double-wishbone type front wheel suspension system comprising a hub carrier for rotatably supporting a front wheel of a vehicle, and upper and lower link devices for connecting upper and lower ends of the hub carrier to a vehicle body, respectively, the upper link device being connected to the vehicle body and the hub carrier at first and second connecting points, respectively, the lower link device including a link element to be applied with a steering force such that the hub carrier is rotated about a kingpin axis which passes a point between the upper and lower ends of the hub carrier, wherein the first connecting point between the upper link device and the vehicle body is situated on rear side in fore-and-aft direction of the vehicle body, with reference to a plane passing the second connecting point between the upper link device and the upper end of the hub carrier and including the kingpin axis.

According to still another aspect of the present invention, there is provided a double-wishbone type front wheel suspension system comprising a hub carrier for rotatably supporting a front wheel of a vehicle, and upper and lower link devices for connecting upper and lower ends of the hub carrier to a vehicle body, respectively, the upper link device being connected to the vehicle body and the upper end of the hub carrier at first and second connection points, respectively, the lower link device including a link element to be applied with a steering force such that the hub carrier is rotated about a kingpin axis which passes a point between the upper and lower ends of the hub carrier, wherein the second connection point is spaced from the kingpin axis by a first distance which is greater than a second distance between the first and second connecting points.

With the above-mentioned arrangement of the suspension system according to the present invention, the movement of the upper end of the hub carrier is restrained by the upper link device during the steering operation to undergo a rotation about the connection point between the hub carrier and the upper link device. On this occasion, as for the outer front wheel which is situated on outer side with reference to a cornering center during the steering operation, the upper end of the hub carrier is also displaced by the upper link device inwardly of the vehicle body accompanying an inward inclination of the hub carrier at its region between the upper and lower ends. It is thus possible to achieve an inward inclination of the kingpin axis for the outer front wheel, which passes through the upper and lower ends of the relevant hub carrier, and thereby realize a camber characteristic of the outer front wheel which exhibits a negative camber tendency during the steering operation.

Moreover, because the desired negative camber tendency can be achieved by the present invention without increasing the caster angle, the required steering force can be maintained at an optimum level and the force component tending to lift the front wheels can be minimized, thereby effectively preserving a natural steering feel.

BRIEF DESCRIPTION OF THE DRAWINGS

The present invention will now be explained in further detail hereinafter, by referring to some specific embodiments illustrated in the accompanying drawings, wherein.

DETAILED DESCRIPTION OF THE PREFERRED EMBODIMENTS

Referring now to FIGS. 1-4, there is shown a double-wishbone type suspension system according to a first embodiment of the present invention which is for a front wheel 1 of an automotive vehicle, not shown. The suspension system includes a hub carrier 2 for rotatably supporting the front wheel 1, having an upper end A which is connected by a ball joint to an upper link device in the form of a link element 3. The upper link element 3 has a base end B which, in turn, is connected to a vehicle body (not shown) by another ball joint. Therefore, the hub carrier 2 is connected to the vehicle body through the upper link element 3 at its upper end A in omnidirectionally oscillatable manner.

The lower end of the hub carrier 2 is connected at points C, D to lower link elements 4, 5 through ball joints, respectively, and the lower link elements 4, 5 have their base ends E, F which are pivotally connected to the vehicle body through elastic bushes, respectively, so that the lower link elements 4, 5 can be oscillated vertically. A lower link device 6 is composed of these link elements 4, 5 and a radius rod 7 which is connected to the middle portion of the lower link element 5 at a point G through a ball joint. The radius rod 7 extends from its rear end at the point G forwardly in the fore-and-aft direction of the vehicle body, and to terminate at its front end H which is pivotally connected to the vehicle body through an elastic bush so that the radius rod 7 can be oscillated vertically. In the way described above, the radius rod 7 serves to support the lower link elements 4, 5 in the fore-and-aft direction of the vehicle body. In this connection, the elastic bush at the front end H is made relatively elastic with regard to the fore-and-aft direction of the vehicle body to improve the ride-harshness characteristics, and is made relatively stiff with regard to the vertical direction.

In order to ensure a sufficient wind-up stiffness by supporting the upper link element 3 in the fore-and-aft direction of the vehicle body, a wind-up link element 8 is diagonally arranged with reference t the fore-and-aft direction and disposed between a middle point I of the hub carrier and a middle point J of the radius rod 7. Both ends of the wind-up link element 8 are rotatably connected to the hub carrier 2 and the radius rod 7 at the connecting points I and J, respectively. Due to the provision of the ball joint at the connecting point I between the hub carrier 2 and the wind-up link element 8, and of the upper link element 3 which can be oscillated in omnidirectional sense, the connection between the hub carrier 2 and the wind-up link element 8 forms a link structure which allows the rotation of the hub carrier 2 about the connecting point I also in the toe direction.

In the manner described above, the connecting point I is provided which can be utilized as a kingpin axis setting point. More particularly, the kingpin axis K can be expressed as a line passing the connecting point I between the hub carrier 2 and the wind-up link element 8 and also passing a steering center D of the lower link device 6, as particularly shown in FIGS. 2 and 3. The hub carrier 2 has a relatively high degree of freedom in designing its geometrical configuration, so that it is possible to relatively freely select the position of the kingpin axis setting point I over a wide range.

Thus, in the embodiment explained above with reference to FIGS. 1-4, the connecting point I is determined such that the kingpin axis K intersects the outer circumferential surface of the front wheel 1 in a plane M which is perpendicular to the rotational axis of the front wheel and which passes the ground contact center X of the front wheel 1, to make the kingpin offset amount zero (FIG. 2). In this case, even when the front wheel 1 is acted upon by braking or driving force at the ground contact center X vertically to the drawing sheet of FIG. 2, a moment is not generated which tends to change the toe angle of the front wheel 1 about the kingpin axis K. It is thus possible to prevent variation of the steering reaction force in the braking or driving state of the vehicle.

Figure 1:
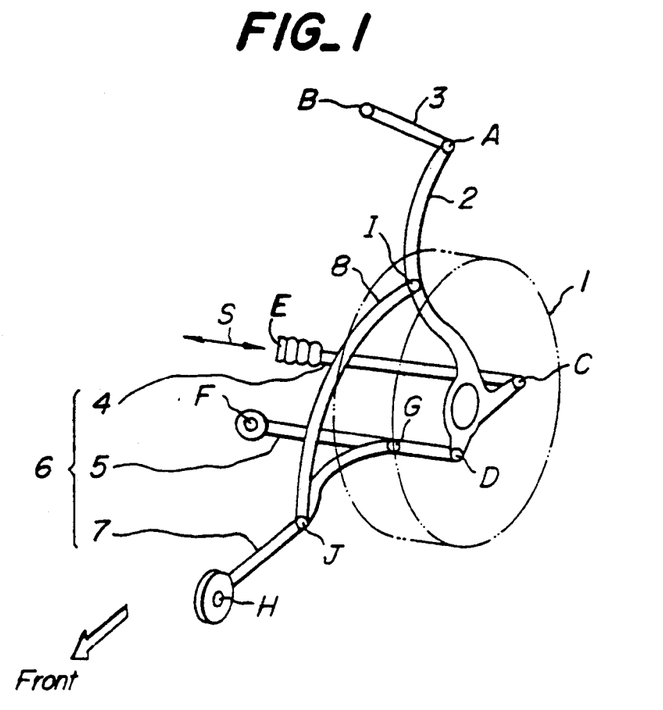
FIG. 1 is a perspective view showing the front wheel suspension system according to a first embodiment of the present invention.
Figure 2:
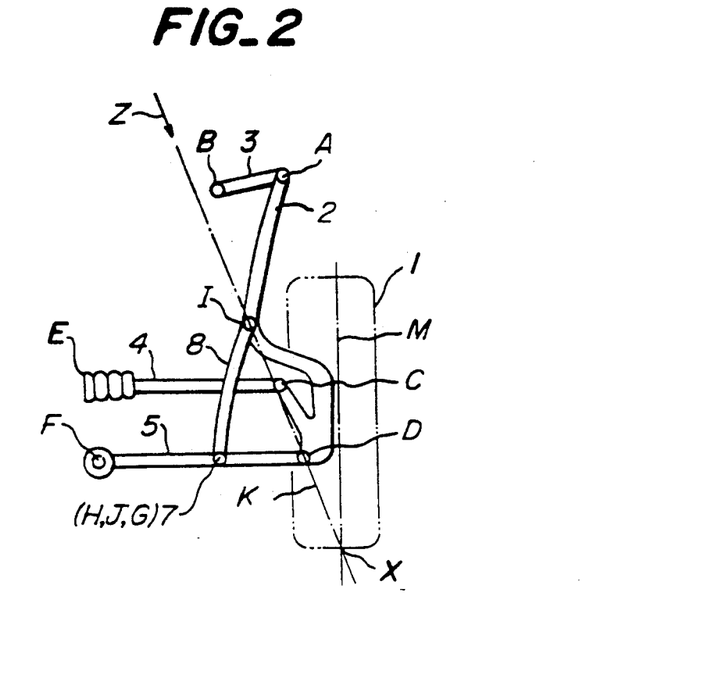
FIGS. 2-4 are respectively front view, side view and top plan view thereof.
Figure 3:
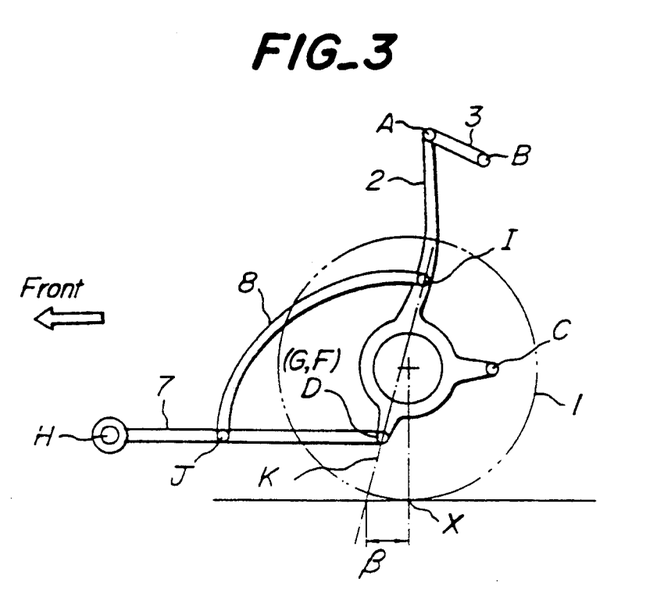
Figure 4:
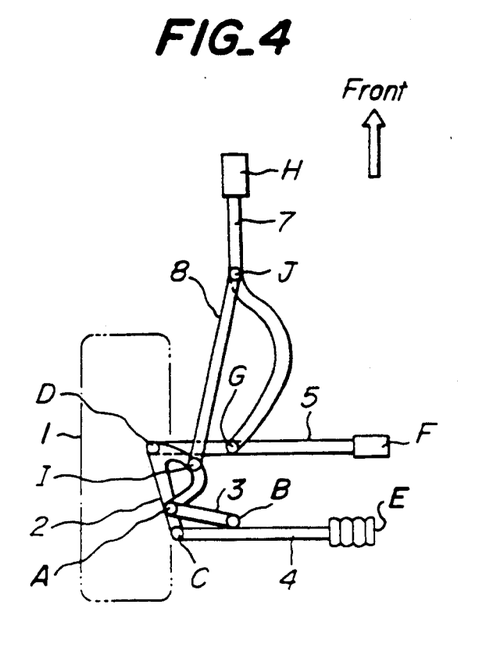

The connecting point I is further determined so that the kingpin axis K can be located such that a positive trail is obtained as illustrated by $\beta$ in FIG. 3; in other words, the kingpin axis K intersects the ground surface on the front side of the vehicle body with reference to the ground contact center X of the front wheel 1. In this case, a side force is generated during the cornering of the vehicle, and acts upon the ground contact center X in FIG. 3 vertically to the drawing sheet, to change the toe angle of the front wheel 1 about the kingpin axis K in the toe-out direction, and thereby provide an improved cornering stability due to an understeering tendency.

The arrangement of the suspension system so far explained is essentially the same as that described in the aforementioned U.S. patent application No. 07/676,112 (now U.S. Pat. No 5,102,159), whose disclosure is herein incorporated by reference.

Figure 5:
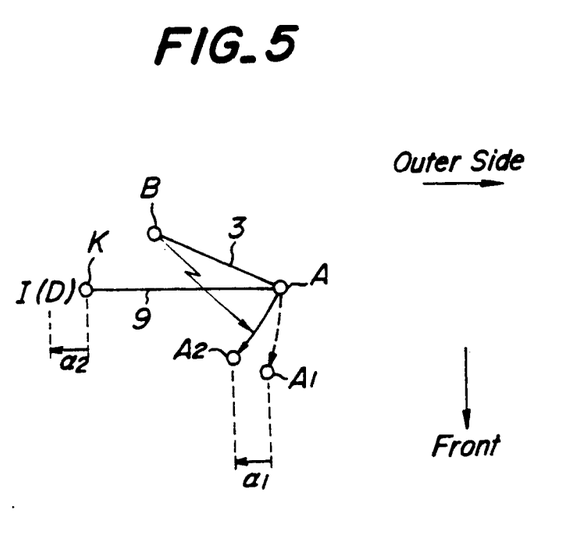
FIG. 5 is a schematic view thereof, as seen in the direction of arrow Z in FIG. 2.
Figure 6:
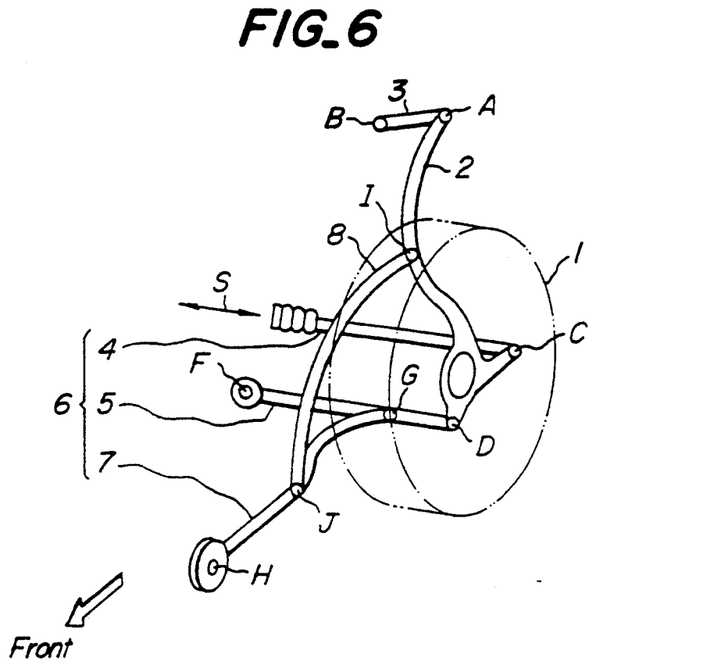
FIGS. 6-9 are respectively perspective view, front view, side view and top plan view, similar to FIGS. 1-4, showing the front wheel suspension system according to a second embodiment of the present invention.
Figure 7:
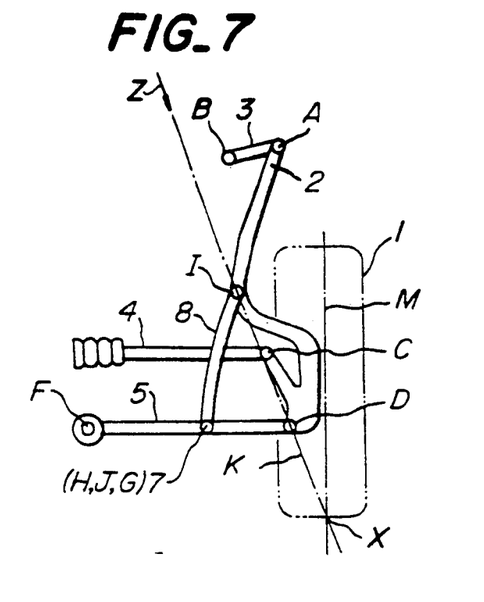
Figure 8:
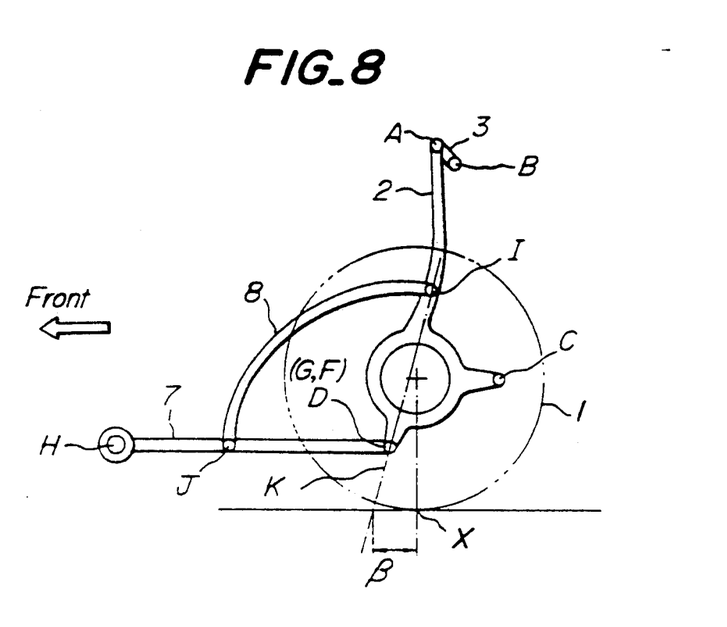
Figure 9:
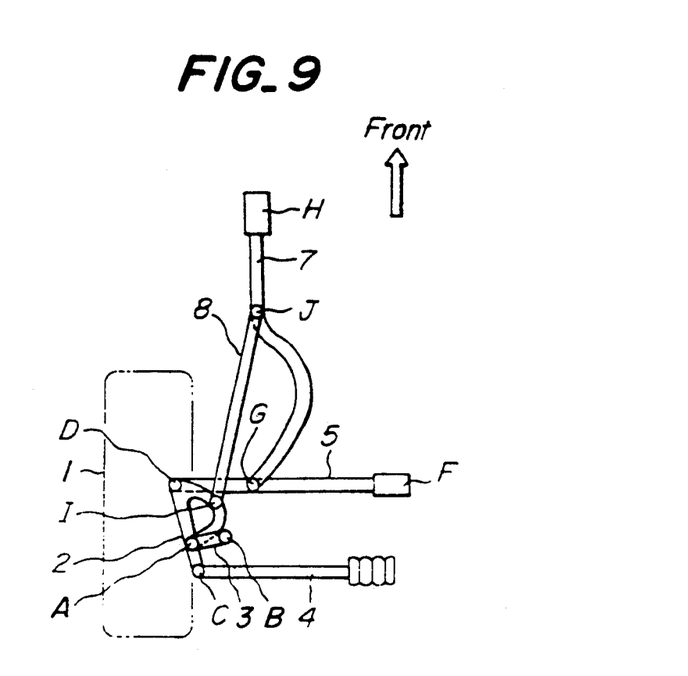

The embodiment explained above with reference to FIGS. 1–4 further features an arrangement wherein the connecting point B between the upper link element 3 and the vehicle body is situated on rear side in fore-and-aft direction of the vehicle body, with reference to a plane 9 which passes the connecting point between the upper link element 3 and the upper end A of the hub carrier 2 and which includes the kingpin axis K, as particularly shown in FIG. 5 which schematically illustrates the arrangement of the suspension system as seen in the direction of arrow Z in FIG. 2.

With such an arrangement, if the upper link element 3 were absent, the upper end A of the hub carrier 2 would be moved to a position Al along an arcuate path about the kingpin axis K. However, according to the present invention, the provision of the upper link element 3 makes it possible to restrain the movement of the upper end A of the hub carrier 2 only as a rotation about the connection point B where the upper link element 3 is connected to the vehicle body. Because the connecting point B is arranged on rear side of the reference plane 9, the upper end A of the hub carrier 2 is moved into an actual position A2 along an arcuate path about the connecting point B relatively inwardly of the vehicle body, by an amount expressed in FIG. 5 as $\alpha_1$. The actual movement of the upper end A of the hub carrier 2 to the position A2 is accompanied by a corresponding inward movement, by an amount $\alpha_2$, of the intermediate point I of the hub carrier 2 where the wind-up link element 8 is connected. Therefore, as for the front wheel which is situated on outer side with reference to the cornering center, the kingpin axis K is tilted inwardly during a steering operation.

It is thus possible, by the embodiment of the present invention explained with reference to FIGS. 1–5, to achieve a camber characteristic with a desired negative camber tendency and to significantly improve the cornering performance of the vehicle. Moreover, since the desired negative camber tendency can be achieved without increasing the caster angle, the required steering force can be maintained at an optimum level and the force component tending to lift the front wheels can be minimized to mitigate a decrease of the relative body height at the vehicle body front section during the steering operation, thereby effectively preserving a natural steering feel.

A second embodiment of the double-wishbone type suspension system for an automotive vehicle front wheel according to the present invention is shown in FIGS. 6–9, wherein the same reference numerals are used to denote the same or equivalent elements in order to eliminate superfluous description. This embodiment is substantially same in basic construction with the previous one, and features an alternative arrangement in that the connection point between the upper link element 3 and the upper end A of the hub carrier 2 is spaced from said kingpin axis K by a distance which is greater than a distance between the upper end A of the hub carrier 2 and the connection point B where the upper link element 3 is connected to the vehicle body.

The embodiment shown in FIGS. 6–9 functions essentially in the same manner as the previous embodiment without, however, requiring the arrangement of the connecting point B between the upper link element 3 and the vehicle body on rear side of the plane 9 which passes the connecting point between the upper link element 3 and the upper end A of the hub carrier 2 and which includes the kingpin axis K.

Figure 10:
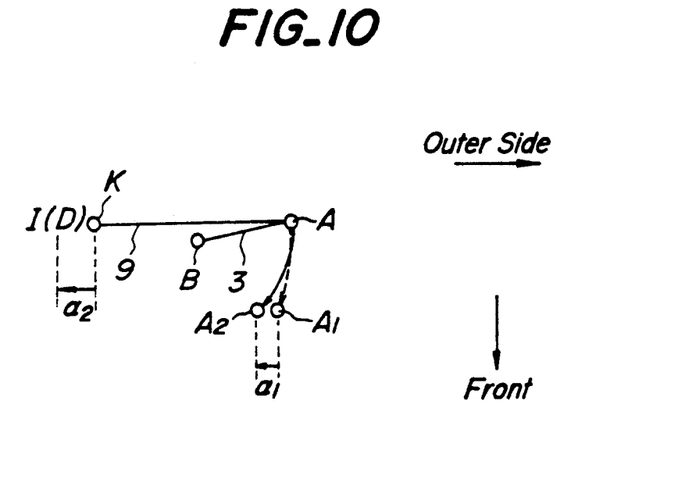
FIG. 10 is a schematic view thereof, similar to FIG. 5, as seen in the direction of arrow Z in FIG. 7.

Thus, as particularly shown in FIG. 10 which is similar to FIG. 5, the upper end A of the hub carrier 2 during the steering operation can be moved to the position $A_2$ along the arcuate path about the connecting point B, instead of the position $A_1$ along the arcuate path about the kingpin axis X. The movement of the upper end A of the hub carrier 2 to the position $A_2$ is accompanied by a corresponding inward movement, by an amount $\alpha_2$, of the intermediate point I of the hub carrier 2 where the wind-up link element 8 is connected. Therefore, as for the front wheel which is situated on outer side with reference to the cornering center, the kingpin axis K is tilted inwardly during a steering operation.

In the embodiment explained above with reference to FIGS. 6–10, depending upon the location of the connecting point B where the upper link element 3 is connected to the vehicle body, the upper end A of the hub carrier 2 may slightly move outwardly of the vehicle body during the initial stage of steering operation. However, the amount of such outward movement of the upper end A of the hub carrier 2 can be maintained within a practically negligible range, since the distance between the upper end A of the hub carrier 2 and the relevant connecting point B is relatively small. In this connection, it is of course possible to arrange the connecting point B between the upper link element 3 and the vehicle body on rear side of the plane 9 which passes the connecting point between the upper link element 3 and the upper end A of the hub carrier 2 and which includes the kingpin axis K, as in the previous embodiment, in order to achieve a further enhanced camber angle variation of the outer front wheel in the negative camber direction during the steering operation.

It will be appreciated from the foregoing detailed description that the present invention provides an improved double-wishbone type suspension system for a front wheel of an automobile vehicle, wherein the outer front wheel has a camber characteristic which exhibits a negative camber tendency during the steering operation, without increasing the required steering force or generating a force component which tends to lift the front wheels, while preserving a natural steering feel.

While the present invention has been explained with reference to some specific embodiments, they were given by way of examples only and it is apparent that various alterations and/or modifications may be made without departing from the scope of the invention.

We claim:

1. A double-wishbone type front wheel suspension system comprising:

a hub carrier for rotatably supporting a front wheel of a vehicle; and upper and lower link devices for connecting upper and lower ends of said hub carrier to a vehicle body, respectively;

said upper link device being connected to the vehicle body and the hub carrier at first and second connecting points, respectively;

said lower link device including a link element to be applied with a steering force such that said hub carrier is rotated about a kingpin axis which passes a point between said upper and lower ends of the hub carrier;

said suspension system having such a geometrical arrangement that, in the case of a front wheel which is situated on an outer side with reference to a cornering center, said second connecting point is caused during a steering operation to move along an arcuate path about said first connecting point so that said kingpin axis is tilted inwardly;

said suspension system further comprising a wind-up link element arranged diagonally with reference to a fore-and-aft direction of the vehicle body, for connecting a middle portion of said hub carrier between said upper and lower ends to said lower link device; and said wind-up link element being rotatably connected to said hub carrier at a third connecting point where said hub carrier is permitted to rotate in a direction of toe angle variation of the front wheel.

2. The suspension system as set forth in claim 1, wherein said first connecting point between said upper link device and the vehicle body is situated on a rear side in the fore-and-aft direction of the vehicle body, with reference to a plane passing said second connecting point between said upper link device and said upper end of the hub carrier and including said kingpin axis.

3. The suspension system as set forth in claim 1, wherein said second connection point between said upper link device and said upper end of the hub carrier is spaced from said kingpin axis by a first distance which is greater than a second distance between said first and second connecting points.

4. The suspension system as set forth in claim 1, wherein said first connecting point between said upper link device and the vehicle body is situated on a rear side in the fore-and-aft direction of the vehicle body, with reference to a plane passing said second connecting point between said upper link device and said upper end of the hub carrier and including said kingpin axis, and wherein said second connection point between said upper link device and said upper end of the hub carrier is spaced from said kingpin axis by a first distance which is greater than a second distance between said first and second connecting points.

5. The suspension system as set forth in claim 1, wherein said third connecting point between the wind-up link element and the hub carrier is located such that a line passing said third connecting point and a steering center of the lower link device intersects an outer circumference of the wheel in a plane which is perpendicular to center axis of an axle for the front wheel and which passes a ground contact center of the front wheel.

6. The suspension system as set forth in claim 1, wherein said third connecting point between the wind-up link element and the hub carrier is located such that a line passing said third connecting point and a steering center of the lower link device intersects a ground surface on a front side of a ground contact center of the front wheel in the fore-and-aft direction of the vehicle body.

7. The suspension system as set forth in claim 1, wherein said lower link device is composed as a link structure including a radius rod which is located in the fore-and-aft direction of the vehicle body, and wherein said wind-up link element is provided between said radius rod and the hub carrier.

8. A double-wishbone type front wheel suspension system comprising:

a hub carrier for rotatably supporting a front wheel of a vehicle; and upper and lower link devices for connecting upper and lower ends of said hub carrier to a vehicle body, respectively;

said upper link device being connected to the vehicle body and the hub carrier at first and second connecting points, respectively;

said lower link device including a link element to be applied with a steering force such that said hub carrier is rotated about a kingpin axis which passes a point between said upper and lower ends of the hub carrier;

wherein said first connecting point between said upper link device and the vehicle body is situated on a rear side in a fore-and-aft direction of the vehicle body, with reference to a plane passing said second connecting point between said upper link device and said upper end of the hub carrier and including said kingpin axis;

said suspension system further comprising a wind-up link element arranged diagonally with reference to the fore-and-aft direction of the vehicle body, for connecting a middle portion of said hub carrier between said upper and lower ends to said lower link device; and said wind-up link element being rotatably connected to said hub carrier at a third connecting point where said hub carrier is permitted to rotate in a direction of toe angle variation of the front wheel.

9. The suspension system as set forth in claim 8, wherein said second connection point between said upper link device and said upper end of the hub carrier is spaced from said kingpin axis by a first distance which is greater than a second distance between said first and second connecting points.

10. The suspension system as set forth in claim 8, wherein said third connecting point between the wind-up link element and the hub carrier is located such that a line passing said third connecting point and a steering center of the lower link device intersects an outer circumference of the wheel in a plane which is perpendicular to center axis of an axle for the front wheel and which passes a ground contact center of the front wheel.

11. The suspension system as set forth in claim 8, wherein said third connecting point between the wind-up link element and the hub carrier is located such that a line passing said third connecting point and a steering center of the lower link device intersects a ground surface on a front side of a ground contact center of the front wheel in the fore-and-aft direction of the vehicle body.

12. The suspension system as set forth in claim 8, wherein said lower link device is composed as a link structure including a radius rod which is located in the fore-and-aft direction of the vehicle body, and wherein said wind-up link element is provided between said radius rod and the hub carrier.

13. A double-wishbone type front wheel suspension system comprising a hub carrier for rotatably supporting a front wheel of a vehicle, and upper and lower link devices for connecting upper and lower ends of said hub carrier to a vehicle body, respectively, said upper link device being connected to the vehicle body and said upper end of the hub carrier at first and second connection points, respectively, said lower link device including a link element to be applied with a steering force such that said hub carrier is rotated about a kingpin axis which passes a point between said upper and lower ends of the hub carrier, wherein said second connection point is spaced from said kingpin axis by a first distance which is greater than a second distance between said first and second connecting points.

14. The suspension system as set forth in claim 13, wherein said first connecting point between said upper link device and the vehicle body is situated on rear side in fore-and-aft direction of the vehicle body, with reference to a plane passing said second connecting point between said upper link device and said upper end of the hub carrier and including said kingpin axis.

15. The suspension system as set forth in claim 13, wherein said second connection point between said upper link device and said upper end of the hub carrier is spaced from said kingpin axis by a first distance which is greater than a second distance between said first and second connecting points.

16. The suspension system as set forth in claim 13, further comprising a wind-up link element arranged diagonally with reference to the fore-and-aft direction of the vehicle body, for connecting a middle portion of said hub carrier between said upper and lower ends to said lower link deice, said wind-up link element being rotatably connected to said hub carrier at a third connecting point where said hub carrier is permitted to rotate in a direction of toe angle variation of the front wheel.

17. The suspension system as set forth in claim 13, wherein said third connecting point between the wind-up link element and the hub carrier is located such that a line passing said third connecting point and a steering center of the lower link device intersects an outer circumference of the wheel in a plane which is perpendicular to center axis of an axle for the front wheel and which passes a ground contact center of the front wheel.

18. The suspension system as set forth in claim 13, wherein said third connecting point between the wind-up link element and the hub carrier is located such that a line passing said third connecting point and a steering center of the lower link device intersects a ground surface on a front side of a ground contact center of the front wheel in the fore-and-aft direction of the vehicle body.

19. The suspension system as set forth in claim 13, wherein said lower link device is composed as a link structure including a radius rod which is located in the fore-and-aft direction of the vehicle body, and wherein said wind-up link element is provided between said radius rod and the hub carrier.

* * * * *